(12) United States Patent
McMahon

(10) Patent No.: US 6,364,937 B1
(45) Date of Patent: Apr. 2, 2002

(54) HUMIDITY CONTROL SYSTEM

(76) Inventor: James P. McMahon, 615 Belknap, San Antonio, TX (US) 78212-4313

( * ) Notice: Subject to any disclaimer, the term of this patent is extended or adjusted under 35 U.S.C. 154(b) by 0 days.

(21) Appl. No.: 09/568,261

(22) Filed: May 10, 2000

(51) Int. Cl.[7] .................... B01D 53/04; B01D 53/26
(52) U.S. Cl. .................... 95/118; 95/126; 96/126; 96/130; 96/132
(58) Field of Search .................... 95/117–126; 96/108, 96/121, 125–128, 130, 131, 143, 146

(56) References Cited

U.S. PATENT DOCUMENTS

| | | | |
|---|---|---|---|
| 1,819,498 A | 8/1931 | Cole | 96/133 |
| 2,428,885 A | 10/1947 | Luáces | 95/125 |
| 2,519,296 A * | 8/1950 | Simpson | 96/130 X |
| 2,626,675 A | 1/1953 | Maher | 96/144 |
| 2,739,664 A | 3/1956 | Parks | 95/124 |
| 3,311,293 A | 3/1967 | Moffatt | 230/209 |
| 3,925,021 A * | 12/1975 | Yoshino et al. | 96/121 X |
| 4,012,206 A * | 3/1977 | Macriss et al. | 96/125 X |
| 4,321,069 A | 3/1982 | Ritter | 96/130 X |
| 4,374,655 A * | 2/1983 | Grodzka et al. | 96/146 X |
| 4,448,592 A | 5/1984 | Linde | 96/130 X |
| 4,516,988 A | 5/1985 | Winter | 96/127 X |
| 4,699,635 A | 10/1987 | Norback | 95/122 X |
| 4,726,817 A | 2/1988 | Roger | 95/115 |
| 4,900,340 A * | 2/1990 | Zuideveld et al. | 96/121 |
| 5,071,449 A | 12/1991 | Sircar | 96/130 X |
| 5,092,135 A | 3/1992 | Cameron | 96/130 X |
| 5,230,719 A * | 7/1993 | Berner et al. | 95/123 X |
| 5,242,473 A * | 9/1993 | Ogasahara | 96/125 |
| 5,401,706 A * | 3/1995 | Fischer | 96/125 X |
| 5,510,063 A | 4/1996 | Gadkaree et al. | 264/29.7 |
| 5,512,083 A * | 4/1996 | Dunne | 96/125 X |
| 5,575,832 A | 11/1996 | Boyd | 95/91 |
| 5,681,370 A | 10/1997 | McMahon | 95/105 |
| 5,702,508 A * | 12/1997 | Moratalla | 96/125 X |
| 5,733,451 A * | 3/1998 | Coellner et al. | 96/125 X |
| 5,750,026 A * | 5/1998 | Gadkaree et al. | 96/125 X |
| 5,817,167 A * | 10/1998 | DesChamps | 96/125 X |
| 5,911,937 A | 6/1999 | Hekal | 264/255 |

FOREIGN PATENT DOCUMENTS

| | | | |
|---|---|---|---|
| CH | 0156896 | 11/1932 | 96/133 |
| DE | 2164688 | * 7/1972 | |
| DE | 3613884 | 10/1987 | |
| FR | 2592 318 | 7/1987 | |
| GB | 2082082 | 3/1982 | 96/130 |
| GB | 2198053 | * 6/1988 | |
| JP | 53-99075 | 8/1978 | |
| JP | 55-061916 | * 5/1980 | |
| JP | 56-078616 | * 6/1981 | |
| JP | 58-008536 | * 1/1983 | |
| JP | 58-027618 | * 2/1983 | |
| JP | 58-047939 | * 3/1983 | |
| JP | 61-007855 | 3/1986 | 95/117 |
| JP | 63-107725 | 5/1988 | 95/125 |
| JP | 63-286635 | * 11/1988 | |
| JP | 04-300620 | * 10/1992 | |
| JP | 05000222 | * 1/1993 | |
| JP | 05-007721 | * 1/1993 | |
| SU | 0841654 | 6/1981 | |

OTHER PUBLICATIONS

U.S. application No. 09/157,208, McMahon, filed Sep. 18, 1998.

* cited by examiner

*Primary Examiner*—Robert H. Spitzer
(74) *Attorney, Agent, or Firm*—Akin, Gump, Strauss, Hauer & Feld, LLP

(57) ABSTRACT

A humidity control system. The system comprises a housing containing one or more hygroscopic monoliths to provide, and passively sustain, the capacity to control the humidity on an intermittent basis. The present invention may be employed either independently or as part of a larger climate control system.

10 Claims, 7 Drawing Sheets

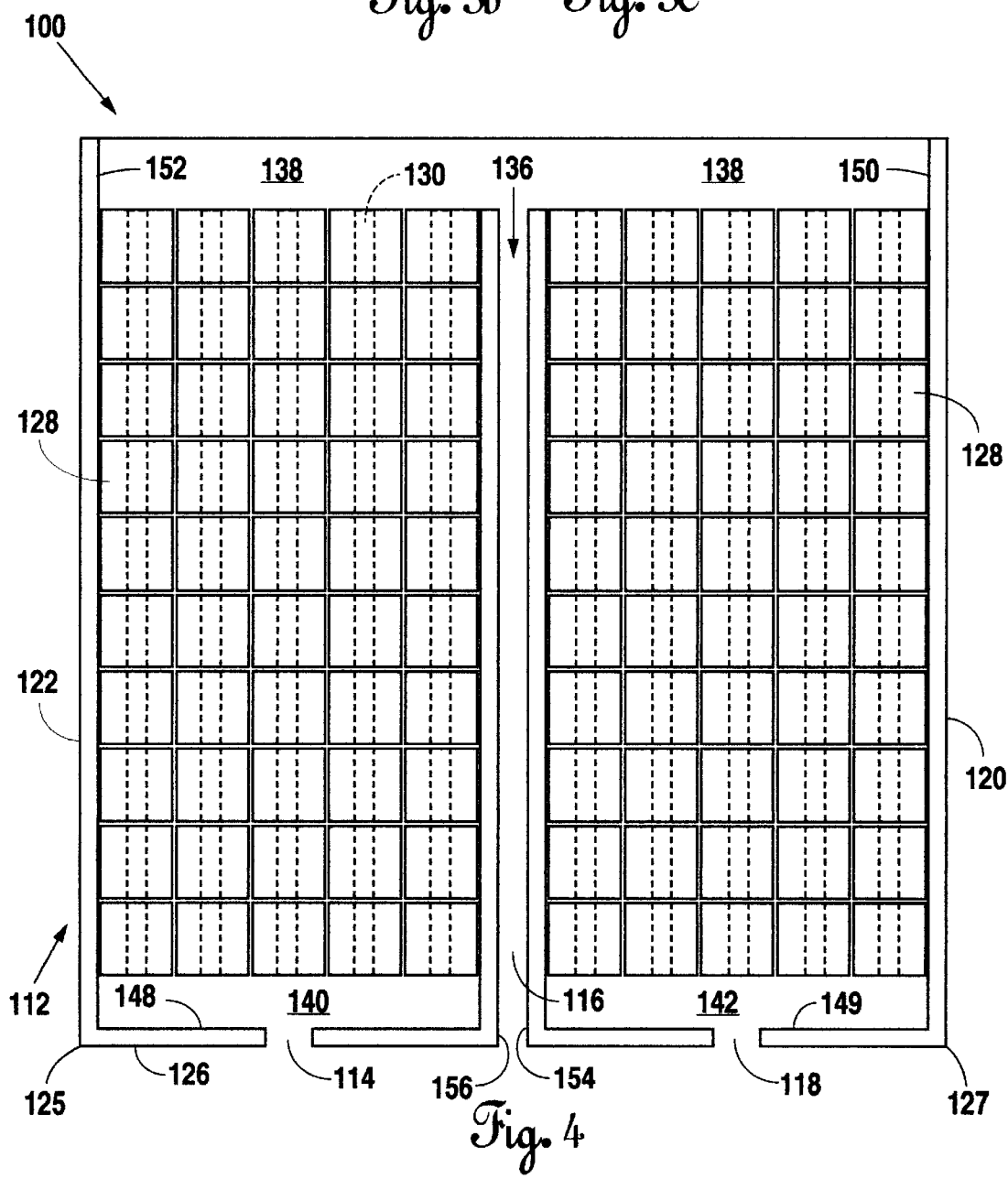

HUMIDITY CONTROL SYSTEM

BACKGROUND OF THE INVENTION

The present invention relates to humidity control systems. More particularly, the present invention relates to a dehumidifier comprising a housing containing one or more hygroscopic monoliths that is capable of providing and passively sustaining the capacity to dehumidify air. The present invention may be employed either independently or as part of a larger or more extensive climate control system.

Typical atmospheric desiccant dehumidifiers employ solid or liquid desiccant to dry working gases, such as removing water vapor from air. Typical solid desiccant dehumidifiers employ desiccant impregnated wheels, columns packed with randomly dispersed desiccants, horizontal desiccant bed trays or multiple vertical beds. Before a desiccant dehumidifier can dry a process air stream, water must be removed from the desiccant by drying or activation induced by, for example, a drying air stream. The drying air stream may employ heat to raise the vapor pressure on the surface of the desiccant causing desorption so that the evolved water vapor can be carried away. Alternatively, the drying stream can comprise dry air having a low water vapor pressure relative to the surface of the desiccant such that desorption is promoted. The activated desiccant must then either be used to modify a process air stream or be isolated by some means, typically with valves or other control mechanisms, to prevent significant reduction in its drying capacity due to exposure to potentially damp ambient conditions. Desiccant dehumidifiers that incorporate desiccant wheels, horizontal bed trays or multiple vertical beds typically work continuously without the ability to retain their drying capacity for intermittent use. Dehumidifiers using columns packed with randomly dispersed desiccant can isolate the activated desiccant with valves affixed at either end of the column to allow intermittent use, but such designs are limited by the pressure drop induced by turbulence created while moving air through the packed column. Further limitations are imposed by the expense of valves and other control components necessary for large air flows as well as the support and retention components required in the packed desiccant columns.

The present invention overcomes limitations inherent to existing systems by incorporating, as a desiccant, one or more hygroscopic monoliths shaped and arranged in such a manner that air is permitted to flow through the desiccant housing without the relatively high pressure resistance or turbulence induced by existing packed columns. The unique shape and arrangement of the hygroscopic monoliths of the present invention also induce a "chimney" effect which allows the dehumidification capacity of the desiccant to be passively preserved, not by the use of valves or control mechanisms, but by allowing the vapor pressure at the surface of the monoliths to approach that of the surrounding air, at which time the drying or adsorption process slows, or even stops, as a state of equilibrium is achieved. In this way, the dehumidification capacity permitted by the present invention can be controlled simply by regulating the airflow through the system without the need to physically isolate the desiccant during non-use. The present system may alternatively operate as a humidifier with the minor modifications described herein.

SUMMARY OF THE INVENTION

Accordingly, the present invention provides a solid desiccant humidity control system that permits flow across a desiccant of, alternatively, a drying air stream or a process air stream with relatively little resistance and pressure drop due to the shape and arrangement of the desiccant. One or more hygroscopic monoliths are incorporated, as a desiccant, into the present invention in a manner that induces a "chimney" effect within and around the monoliths, thereby permitting the dehumidification capacity of the desiccant to be passively preserved without the use of valves or control mechanisms by allowing the vapor pressure at the surface of the monoliths to approach that of the surrounding air, at which time the drying or adsorption process slows, or even stops, as a state of equilibrium is achieved. Because of this "chimney" effect and the state of equilibrium it encourages, the dehumidification capacity of the desiccant employed in the present invention can be preserved simply by regulating the airflow through the system without the need to physically isolate the desiccant during periods of non-use.

The drying air stream may be air at an elevated temperature relative to the process stream or an air stream with a water vapor pressure lower than that of the process stream. Thus, the present invention provides a dehumidifier that can be utilized in a wide variety of settings, including incorporation into a wide variety of climate control systems, due to the ease of flow through the unit and its ability to operate intermittently in response to dehumidification demand or the availability of a drying air stream that reactivates the desiccant. By using a charging stream in lieu of a drying stream, the present invention may alternatively serve as a humidifier. The present invention comprises a housing having a cavity containing a hygroscopic material, such as one or more hygroscopic monoliths. In an exemplary embodiment of the invention, the housing defines a cavity with inlet and outlet ports located in the base of the housing. Except for the inlet and outlet ports, the housing is sealed at its top, its bottom and along all sides, although optional, sealed access may be provided for sensors, gauges and the like if desired. Disposed or positioned within the housing is an array of hygroscopic monoliths, such as the kind shaped to facilitate circulation and drying by means of a "chimney" effect as disclosed in U.S. patent application Ser. No. 09/157,208, filed Sep. 18, 1998, entitled "Hygroscopic Monolith Having a Channel Therethrough for Modifying a Gas Therein by Adsorption or Desorption, and Processes Therefore," the disclosure of which is incorporated by reference as if set forth herein in its entirety. Such application discloses a variety of shapes useful for achieving the beneficial effects imparted by the present invention. In addition, hygroscopic monoliths shaped as cubes having a single cylindrical channel, as disclosed herein, may be utilized in the present invention.

The hygroscopic monoliths may be composed of, for example, zeolite, or any similar hygroscopic material. The hygroscopic monoliths are situated within the housing such that a drying air stream can, with relatively low resistance or pressure drop, flow across the external surfaces of the monoliths as well as through channels disposed among the monoliths. Elastomeric Hi gaskets create passages within the housing to direct the drying stream, and alternatively the process stream, to and from the monoliths. A drying air stream may be obtained from a wide variety of sources, including solar thermal, geothermal, waste or vented heat, combustion, electrical resistance, heat pipes, heat pumps or other dehumidifiers.

After undergoing activation, the hygroscopic monoliths gradually dry the air contained within the housing and the drier air, being more buoyant, tends to rise within the housing. The activated monoliths therefore promote air circulation within the housing, generally filling the cavity from the top down with the driest portion of the contained air. The monoliths will continue to promote circulation of the air contained within the housing until the vapor pressure at the surface of the monoliths approaches that of the surrounding air, at which time the drying or adsorption process slows, or even stops, as a state of equilibrium is achieved. In this way, the present invention possesses the ability to retain its drying capability by isolating the monoliths from the process air stream and ambient air external to the housing through passive means during cooling or inactivity between periods of intermittent use.

A dehumidifier according to the present invention may have various configurations of enclosure surfaces, port locations, passageway orientations and hygroscopic monolith shapes to permit selective utilization of the buoyant forces within the enclosure, the available drying stream and any other performance-modifying aspects attributable to a particular setting. Airflow through the ports can be induced by suction, positive air pressure or a combination of both suction and pressure. Airflow may also be induced or assisted by orienting the housing such that buoyant forces expel drier air out of the housing while drawing relatively heavier, water-vapor-laden ambient air into the housing.

The present invention may alternatively be utilized as a humidifier if ports are located at the top of the housing and, in lieu of a drying stream, a charging air stream having a lower temperature or higher water vapor pressure than the process stream flows across the desiccant, thereby promoting adsorption of water vapor upon contact of the charging stream with the monoliths. In the absence of a charging or process air stream, the air within the housing interacts with the charged monoliths and, in so doing, becomes progressively more laden with water vapor. This moisture-laden air, being heavier relative to drier air, generally tends to settle around the monoliths until the vapor pressure at the surface of the monoliths approaches that of the surrounding air and desorption slows, or even stops, as a state of equilibrium is achieved. In this way, a system comprising the present invention possesses the ability to retain its humidification capability by isolating the monoliths from the process air stream through passive means during cooling or inactivity between periods of intermittent use.

The dehumidifying capability provided by the present invention may be employed either independently or as a component of a larger unit. Similarly, the humidifying capability provided by the present invention may also be employed either independently or as a component of a larger unit.

BRIEF DESCRIPTION OF THE DRAWINGS

FIGS. 3a, 3b and 3c present a composite view of the top, front and side, respectively, of one embodiment of the hygroscopic monoliths utilized in the present invention.

FIG. 4 is a cross-sectional view of the system depicted in FIG. 1.

DETAILED DESCRIPTION OF THE PREFERRED EMBODIMENT

Figure 1:
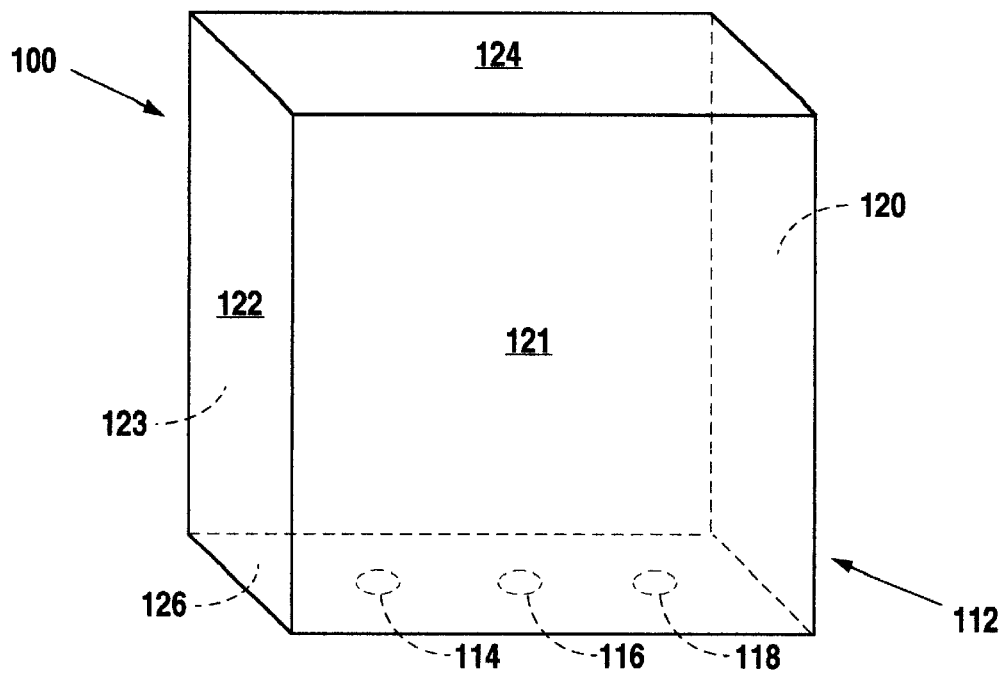
FIG. 1 is a perspective view of a system according to the invention.

Referring to FIG. 1, an embodiment of the present invention is shown as a dehumidifier 100 comprising a housing 112 constructed of aluminum sheeting 0.03 inches thick. Housing 112 comprises a front panel 121, a back panel 123 opposing front panel 121, a first side panel 120, a second side panel 122 opposing first side panel 120, a bottom panel 126, and a top panel 124 opposing bottom panel 126. Front panel 121 and back panel 123 each measure 12 inches wide by 12 inches high. First side panel 120 and second side panel 122 each measure 12 inches high by 1 inch wide. Bottom panel 126 and top panel 124 each measure 12 inches in length by 1 inch wide. Bottom panel 126 includes ports 114, 116, and 118, each being 0.5 inches in diameter.

Figure 2A:
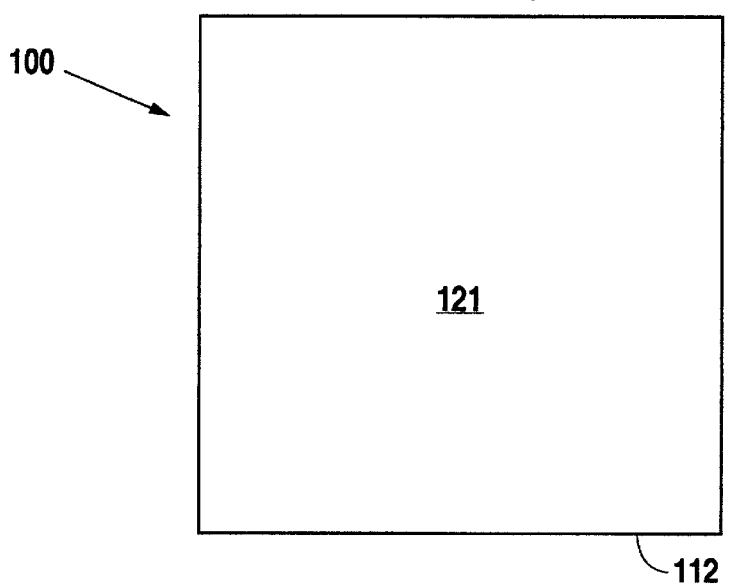
FIGS. 2a, 2b and 2c present a composite view of the front, side and bottom, respectively, of a system according to the present invention.
Figure 2B:
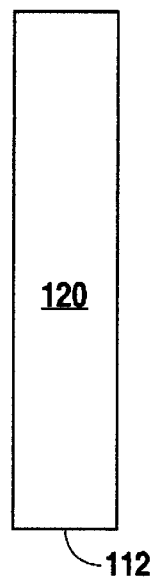

Referring to FIG. 2a, front panel 121 of dehumidifier 100 is shown. Referring to FIG. 2b, first side panel 120 of dehumidifier 100 is shown.

Figure 2C:
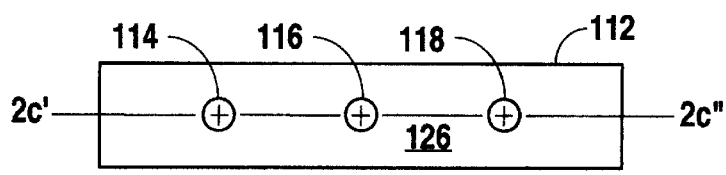
Figure 5:
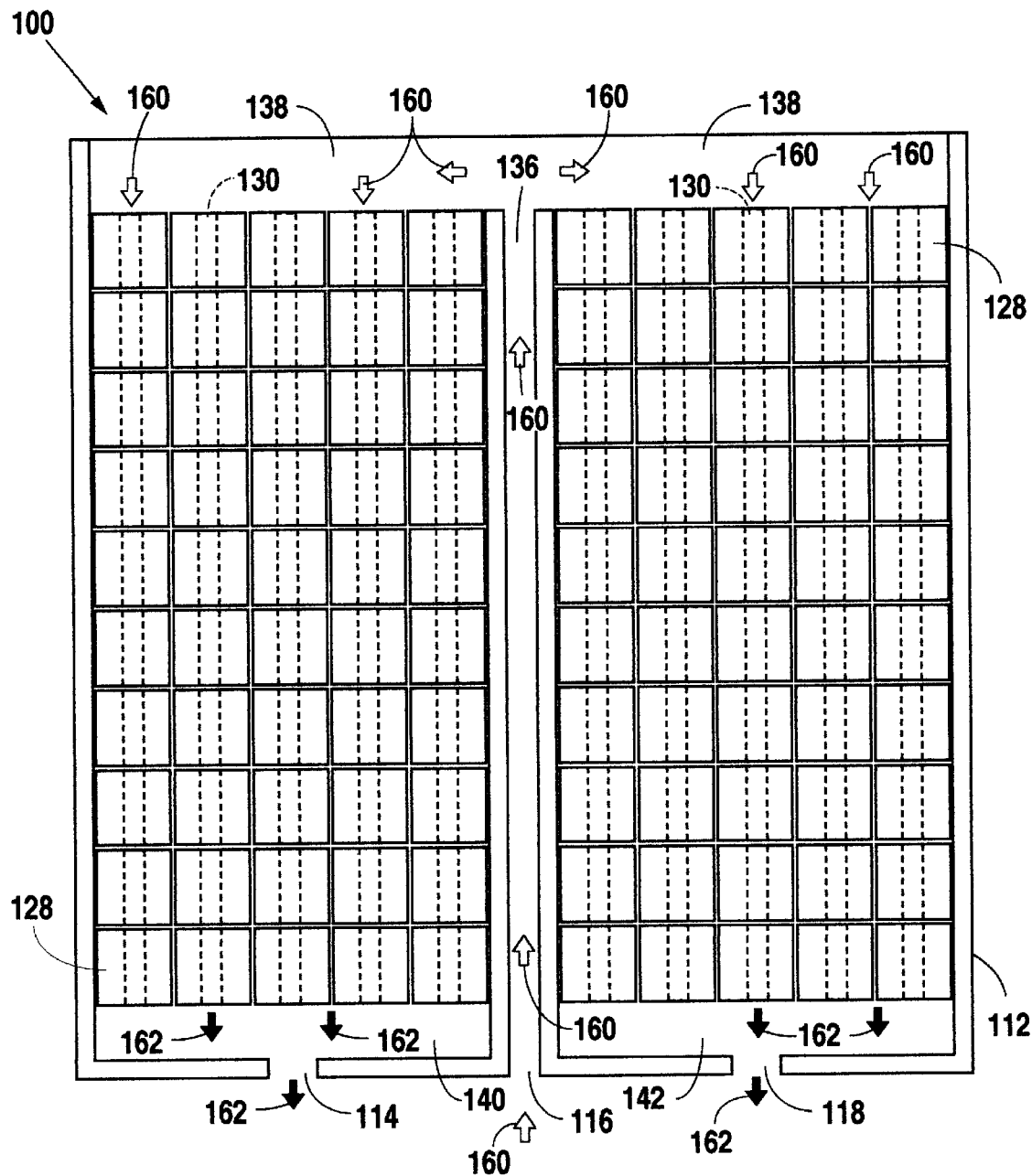
FIG. 5 is a cross-sectional view of the system depicted in FIG. 1 illustrating airflow in the activation mode.
Figure 6:
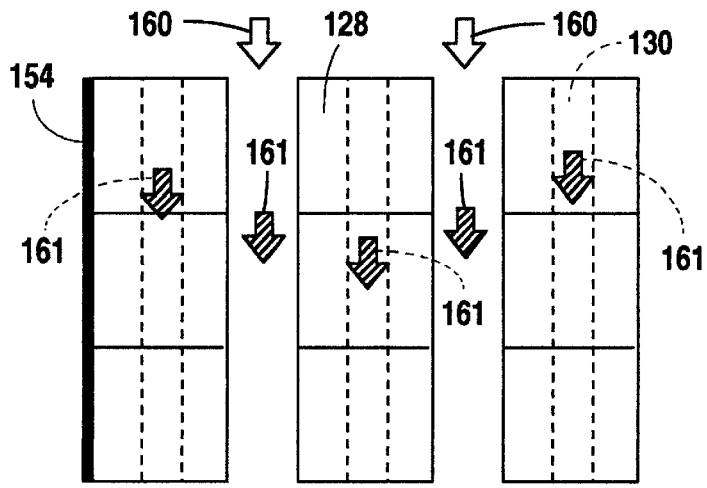
FIG. 6 is a view depicting a portion of the system depicted in FIG. 5 with exaggerated dimensions showing airflow through and across the hygroscopic monoliths utilized in the present invention.
Figure 7:
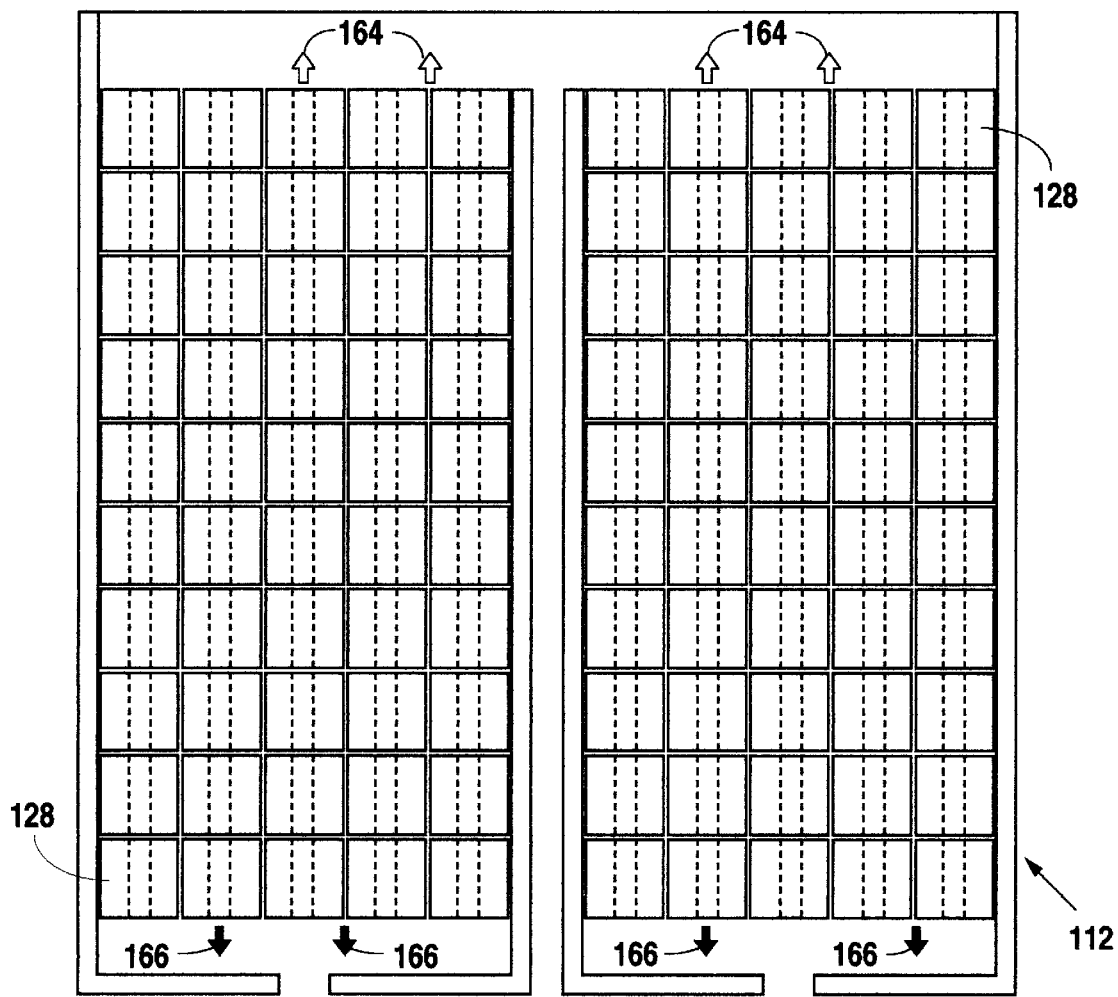
FIG. 7 is a cross-sectional view of the system depicted in FIG. 1 illustrating airflow in the inactive mode.
Figure 8:
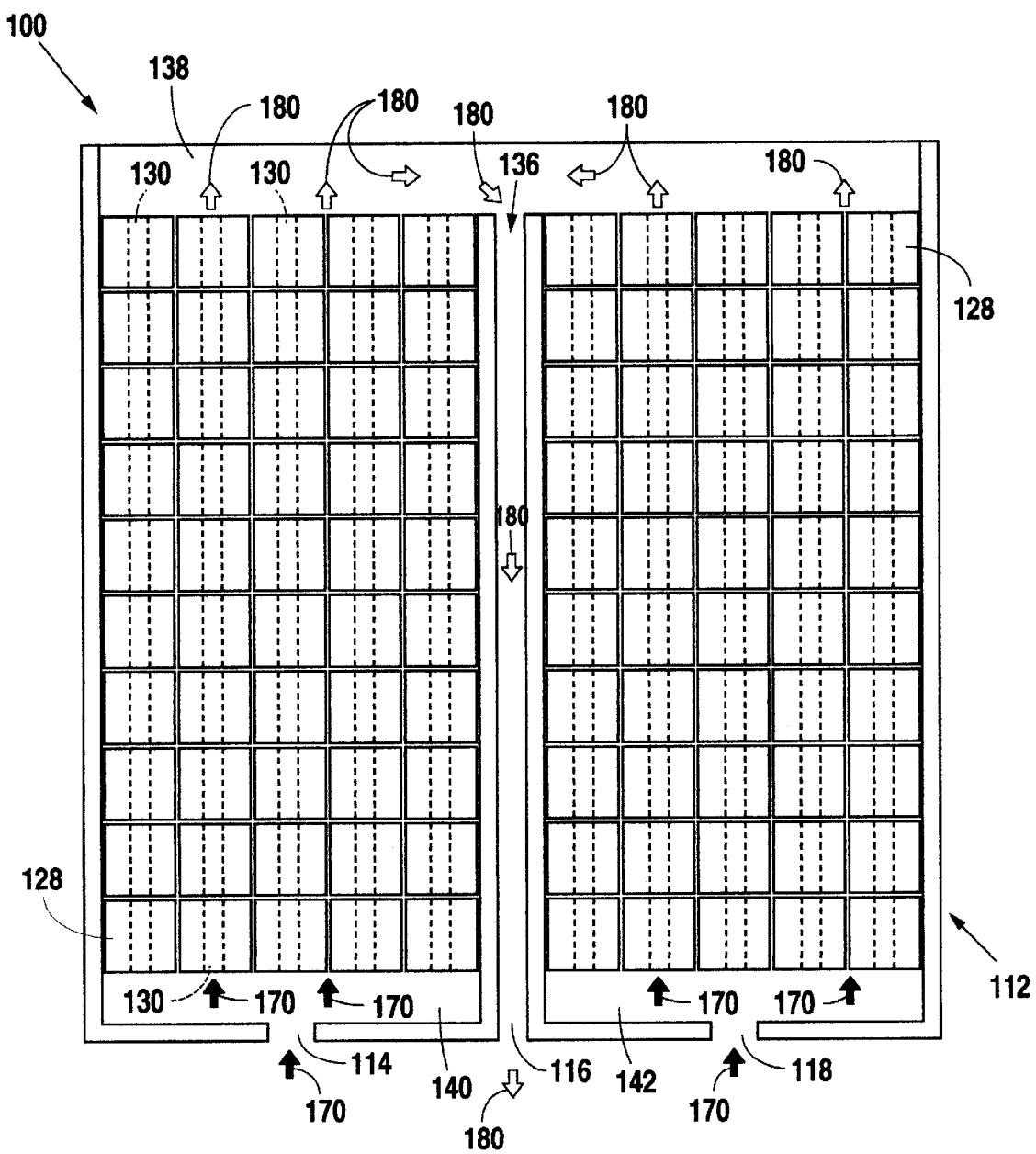
FIG. 8 is a cross-sectional view of the system depicted in FIG. 1 illustrating airflow in the working mode.

Referring now to FIG. 2c, a line from 2c' to 2c'' bisects the width of bottom panel 126. Port 116 is centered in bottom panel 126 such that the center of port 116 bisects both the length and the width of bottom panel 126. Port 114 is positioned in bottom panel 126 such that port 114 is equidistant from port 116 and the juncture of bottom panel 126 with second side panel 122 while the center of port 114 bisects the width of bottom panel 126. Port 118 is positioned in bottom panel 126 such that port 118 is equidistant from port 116 and the juncture of bottom panel 126 with first side panel 120 while the center of port 118 bisects the width of bottom panel 126.

Referring to FIGS. 3a, 3b and 3c, a single hygroscopic monolith 128 of the preferred embodiment is shown in three views. FIG. 3a presents a top view of hygroscopic monolith 128. FIG. 3b presents a front view of hygroscopic monolith 128. FIG. 3c presents a side view of hygroscopic monolith 128. Hygroscopic monolith 128 is comprised of a hygroscopic material shaped into cubes with each of its three axes being 1 inch in length. Extending through hygroscopic monolith 128 is cylindrical passageway 130. Cylindrical passageway 130 has a diameter of 0.25 inches centered laterally within the cube and extending the fall height of hygroscopic monolith 128.

Referring to FIG. 4, a plurality of hygroscopic monoliths 128 are disposed within housing 112. The plurality of hygroscopic monoliths 128 are arranged top-to-bottom in each of ten columns so that, in a given column, cylindrical passageway 130 of each hygroscopic monolith 128 is aligned with every other cylindrical passageway 130 of the remaining hygroscopic monoliths 128 to form a continuous, elongated cylindrical passageway. Each hygroscopic monolith 128 is placed in contact with the interior of front panel 121 and the interior of the back panel 123 at opposing sides. A distance of 0.125 inches separates each column from the next, except that a channel 136 separates the first five columns from the last five columns by a span of 0.75 inches from column-to-column. The 0.125 inch separation between each set of adjacent columns creates a channel that permits airflow over the external surfaces of hygroscopic monoliths 128.

Referring again to FIG. 4, bottom panel 126 has opposing ends, one of which joins first side panel 120 at juncture 127 while the other joins second side panel 122 at juncture 125. An elastomeric gasket 148 covers the entire interior surface of bottom panel 126 except that holes through elastomeric gasket 148 are aligned with, and have the same diameter as, each of ports 114, 116, and 118. An elastomeric gasket 150 covers the entire interior surface of first side panel 120. An elastomeric gasket 152 covers the entire interior surface of second side panel 122. An elastomeric gasket 154 is disposed between channel 136 and an adjacent column such that it covers the entire side of the column nearest elastomeric gasket 154 while extending to contact bottom panel 126. Similarly, an elastomeric gasket 156 is disposed between channel 136 and the other column adjacent to channel 136 such that it covers the entire side of the column nearest elastomeric gasket 1,56 while extending to contact bottom panel 126. Each elastomeric gasket 148, 150, 152, 154 and 156 is 0.125 inches thick and 1 inch wide such that each elastomeric gasket simultaneously contacts both front panel 121 and back panel 123.

Referring again to FIG. 4, a channel 138 extends across the upper portion of housing 112 left unoccupied by the plurality of hygroscopic monoliths 128, spanning from elastomeric gasket 152 to elastomeric gasket 150. A channel 140 extends across the lower left portion of housing 112 from left unoccupied by the hygroscopic monoliths 128, spanning from elastomeric gasket 152 to elastomeric gasket 156. A channel 142 extends across the lower right portion of housing 112 from left unoccupied by the hygroscopic monoliths 128, spanning from elastomeric gasket 150 to elastomeric gasket 154. Each channel 138, 140 and 142 has an approximate height of 1 inch and spans from the interior surface of front panel 121 to the interior surface of back panel 123.

Referring now to FIG. 5, FIG. 6, FIG. 7 and FIG. 8, an exemplary operation of dehumidifier 100 will be described. In an exemplary operation, dehumidifier 100 runs sequentially through three modes. In the first such mode (activation mode), the plurality of hygroscopic monoliths 128 are dried or activated by a drying air stream 160 (exemplified in FIG. 5 by outlined arrows). In the second such mode (passive cooling or inactive mode), the system is at rest and permitted to achieve equilibrium. In the third such mode (working mode), a process air stream 170 is dried by the plurality of hygroscopic monoliths 128, progressively becoming product air stream 180 as moisture is adsorbed or desorbed from process air stream 170. The period of time during which the dehumidifier 100 operates in any of the three modes depends selectively upon either dehumidification demand, product air stream 180 demand or the availability of drying air stream 160. The period of time during which the dehumidifier 100 operates in any of the three modes is not critical to functionality, but will determine the relative performance of the system, which will also vary due to ambient conditions, monolith saturation, airflow rates and other similar factors. The order of occurrence of the modes may also vary according to demand. For instance, the system permits selection of the inactive mode and the working mode on an intermittent basis as desired.

Referring again to FIG. 5, when dehumidifier 100 operates in activation mode, drying air stream 160 enters housing 112 at port 116 and then travels through channel 136. After exiting the uppermost portion of channel 136, drying air stream 160 splits into substantially equal portions to flow in either direction through channel 138. After flowing through channel 138, drying air stream 160 flows downward between the plurality of hygroscopic monoliths 128 as well as through each elongated cylindrical passageway formed by a plurality of cylindrical passageways 130 while maintaining fluid contact therewith, thereby heating the monoliths and thus raising the water vapor pressure at the surface of the monoliths and causing water vapor to be desorbed from the monoliths into drying air stream 160. Drying air stream 160, as it flows through and across the plurality of hygroscopic monoliths 128, becomes progressively laden with water vapor until flowing into either channel 140 or channel 142, respectively, before being purged through ports 114 and 118, respectively. The air stream purged from housing 112 is depicted by solid arrows 162.

Referring again to FIG. 6, drying air stream 160 is shown flowing through the elongated cylindrical passageways formed by the plurality of cylindrical passageways 130 and through the channels separating the columns of hygroscopic monoliths 128. As drying air stream 160 flows in this manner, water vapor is desorbed from hygroscopic monoliths 128, becoming progressively laden with moisture as depicted by hatched arrows 161.

Referring again to FIG. 7, when dehumidifier 100 operates in passive mode, the plurality of hygroscopic monoliths 128 promote air circulation by way of a "chimney" effect which causes the lighter, drier air 164 (exemplified in FIG. 7 as outlined arrows) within housing 112 to rise toward the upper portion of housing 112 while the relatively heavier, damper air 166 (exemplified in FIG. 7 as solid arrows) within housing 112 accumulates in the lower portion of housing 112. The circulation resulting from the interaction of the air within housing 112 with the plurality of hygroscopic monoliths 128 surrounds the monoliths with progressively drier air, and as it ensues, the vapor pressure near the surface of the monoliths approaches that of the surrounding air at which point the adsorption of water vapor from the air within housing 112 slows, or even stops, as equilibrium is achieved. Thus, the remaining drying or dehumidification capacity of the dehumidifier is retained for future use as desired. The passive mode described herein may dually serve as a cooling mode wherein heat accumulated within the dehumidifier is conducted through, and then dissipated by, the aluminum comprising housing I 12.

Referring again to FIG. 8, when the dehumidifier operates in working mode, a negative pressure is applied to port 116 inducing the flow of a process air stream flow 170 (exemplified in FIG. 8 as solid arrows) while collecting a product air stream 180 (exemplified in FIG. 8 as outlined arrows). Process air stream flow 170 enters in approximately equal portions through ports 114 and 118 and flows through channels 140 and 142 respectively before passing through and across the plurality of hygroscopic monoliths 128 where it is progressively dried to become product air stream 180. Product air stream 180 then flows, in separate portions, into channels 134 and 138, respectively, before combining at channel 136 and then being collected through port 116.

Figure 9:
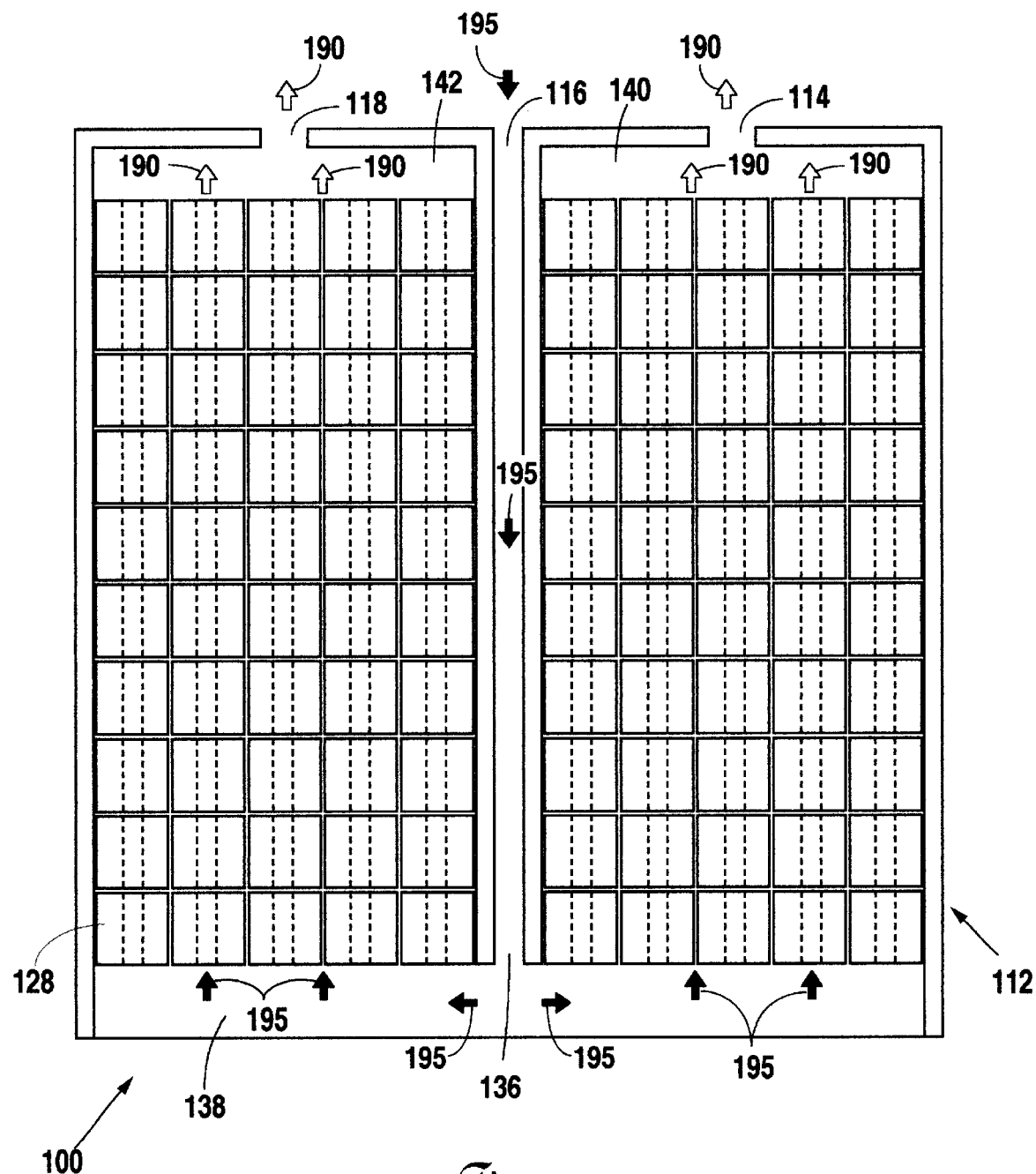
FIG. 9 is a cross-sectional view of the system according to the present invention illustrating airflow in the working mode upon reorientation and with passive isolation.

Referring now to FIG. 9, a working mode of dehumidifier 100 is illustrated wherein the dehumidifier has been previously activated and reoriented by rotating it so that ports 114, 116, and 118 are at the top of housing 112. In this manner, passage of air through the system provides buoyant forces or a "chimney" effect that induces the flow of a product air stream 190 (exemplified in FIG. 9 as outlined arrows) and the flow of a process air stream 195 (exemplified in FIG. 9 as solid arrows) that persist until the water vapor pressure at the surface of monoliths nears equilibrium with that of the process stream.

Figure 10:
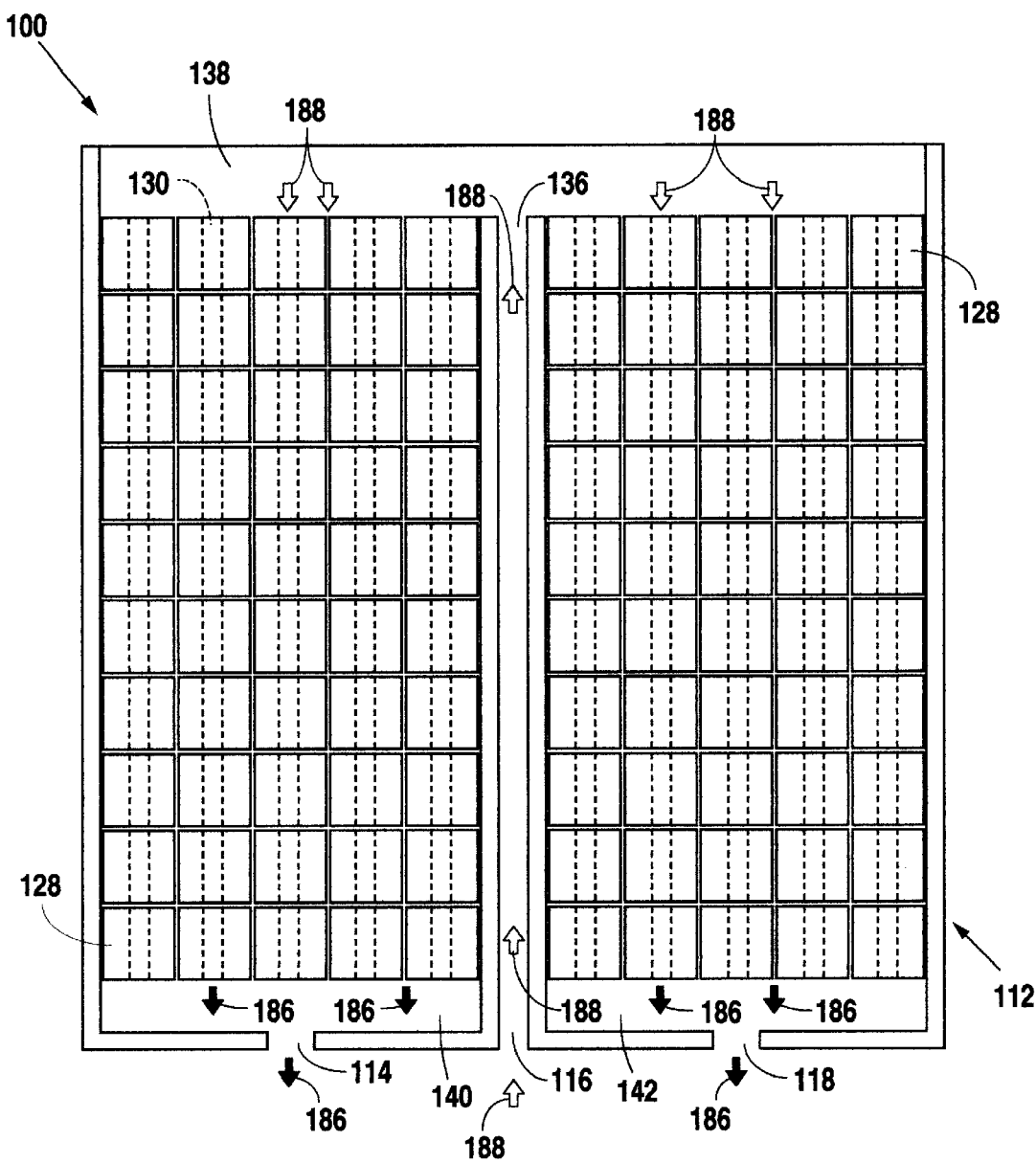
FIG. 10 is a cross-sectional view of the system depicted in FIG. 1 illustrating airflow in the activation mode in the absence of a drying stream and with a heat source for activating the monoliths.

An alternative use of the present invention is also provided wherein the activation mode is performed using a separate heat source in lieu of a drying air stream. A variety of heat sources can be utilized for this purpose, including solar insolation, radiant thermal energy from heating elements or components in inefficient thermal systems and devices, or by contact heating with heating elements, heat exchangers or heat pipes. Referring then to FIG. 10, in the usage described herein, heat is supplied to the exterior surface of the aluminum comprising housing 112. Heat is distributed across, and conducted through, housing 112 to the plurality of hygroscopic monoliths 128, resulting in drying or activation of the monoliths. As the thermal energy raises the water vapor pressure in the plurality of hygroscopic monoliths 128, some water vapor is adsorbed or desorbed into the portion of air surrounding the monoliths, thus making the air heavier and inducing a discharge through ports 114 and 118. Thus, a flow or "chimney" effect is established with the heavier, damper portion of air 186 (exemplified in FIG. 10 as solid arrows) exiting housing 112 through ports 114 and 118, while replacement air 188 (exemplified in FIG. 10 as outlined arrows) flows into housing 112 through port 116. The induced flow is maintained as long as heat is supplied to housing 112 and continues until the water vapor pressure near the surface of the plurality of hygroscopic monoliths 128 approaches that of the surrounding air within housing 112.

Accordingly, a system according to the present invention allows the implementation of a method for controlling the humidity of a working gas with passive means for intermittent use as desired. The method of controlling humidity of a gas comprises the following steps: (a) drawing gas into a housing having a cavity therein; (b) channeling the gas to a hygroscopic material, having one or more channels, positioned within the cavity, said hygroscopic material being shaped to facilitate airflow by a chimney effect, whereby the gas is in fluid communication with said hygroscopic material and at least some of which is adsorbed or desorbed; and (c) collecting the gas from the housing. The hygroscopic monoliths may be activated or dried, once or repeatedly, as desired. This method for controlling humidity may be employed in isolation or, alternatively, in conjunction with other climate control operations.

While the present invention has been described in connection with the control of water vapor, it should be understood that the present invention may be utilized to remove other constituents from a working gas, such as volatile hydrocarbons, ammonia, mercaptains, hydrogen sulfide, organics or other components. To do so, a system according to the present invention would incorporate monoliths selected for their ability to adsorb or desorb the targeted constituent. It should also be understood that multiple constituents could be targeted by employing an appropriate variety of monoliths within a single housing.

While the humidity control system of the present invention has been described in connection with an exemplary embodiment, it is not intended to limit the invention to the particular form set forth, but on the contrary, it is intended to cover such alternatives, modifications and equivalents as may be within the spirit and scope of the invention as defined by the appended claims.

What I claim is:

1. A process for controlling humidity of a gas, comprising the steps of:
   (a) flowing gas through an open inlet port into a housing having a cavity therein;
   (b) channeling said gas to a hygroscopic material, having one or more channels, positioned within said cavity, said hygroscopic material being shaped to facilitate airflow by a chimney effect, whereby said gas is in fluid communication with said hygroscopic material and the humidity of said gas is decreased or increased through adsorption or desorption by said hygroscopic material; and
   (c) collecting said gas from said housing through an open outlet port in said housing on the same side of said housing as said inlet port, whereby in the absence of said gas flowing through said inlet port, the dehumidification or humidification capacity of said hygroscopic material is passively preserved by buoyancy forces within said housing without the need to close said ports.

2. A process for controlling humidity of a gas, as recited in claim 1, wherein steps (a) through (c) are repeated.

3. A process for controlling humidity of a gas, as recited in claim 1, wherein said hygroscopic material is dried or activated prior to step (a).

4. A process for controlling humidity of a gas, as recited in claim 3, wherein said hygroscopic material is dried or activated by applying an external heat source to said housing.

5. A humidity control system, comprising:
   a housing having a cavity therein, said housing having an open inlet port and an open outlet port, said inlet port and outlet port being open without the need of valves, and
   a hygroscopic material, having one or more channels, positioned within said cavity, said hygroscopic material being shaped to facilitate airflow by a chimney effect, whereby when a gas enters said inlet port and contacts said hygroscopic material within said housing, the humidity of said gas is decreased or increased through adsorption or desorption by said hygroscopic material, and said gas thereafter exits said outlet port, whereby in the absence of said gas entering said inlet port, the dehumidification or humidification capacity of said hygroscopic material is passively preserved by buoyancy forces within said housing without the need to close said ports.

6. A humidity control system, as recited in claim 5, wherein said hygroscopic material comprises a plurality of hygroscopic monoliths.

7. A humidity control system, as recited in claim 6, wherein said hygroscopic monoliths are shaped zeolite.

8. A humidity control system, as recited in claim 5, wherein said hygroscopic material is first dried or activated.

9. A humidity control system, as recited in claim 5, wherein said inlet port and said outlet port are both located at a top or a bottom of said housing.

10. A system for controlling the amount of constituent within a gas, comprising:
    a housing having a cavity therein, said housing having an open inlet port and an open outlet port, said inlet port and outlet port being open without the need of valves, and
    a material capable of adsorbing or desorbing said constituent, said material having one or more channels and being positioned within said cavity, said material being shaped to facilitate airflow by a chimney effect, whereby when a gas enters said inlet port and contacts said material within said housing, the amount of said constituent within said gas is decreased or increased through adsorption or desorption by said material, and said gas thereafter exits said outlet port, whereby in the absence of said gas entering said inlet port, the adsorption or desorption capacity of said material is passively preserved by buoyancy forces within said housing without the need to close said ports.

* * * *